Dec. 25, 1956    S. H. SALLIE ET AL    2,775,532
METHOD AND APPARATUS FOR MAKING PATTERNED SIDING
Filed Sept. 24, 1952    2 Sheets-Sheet 1
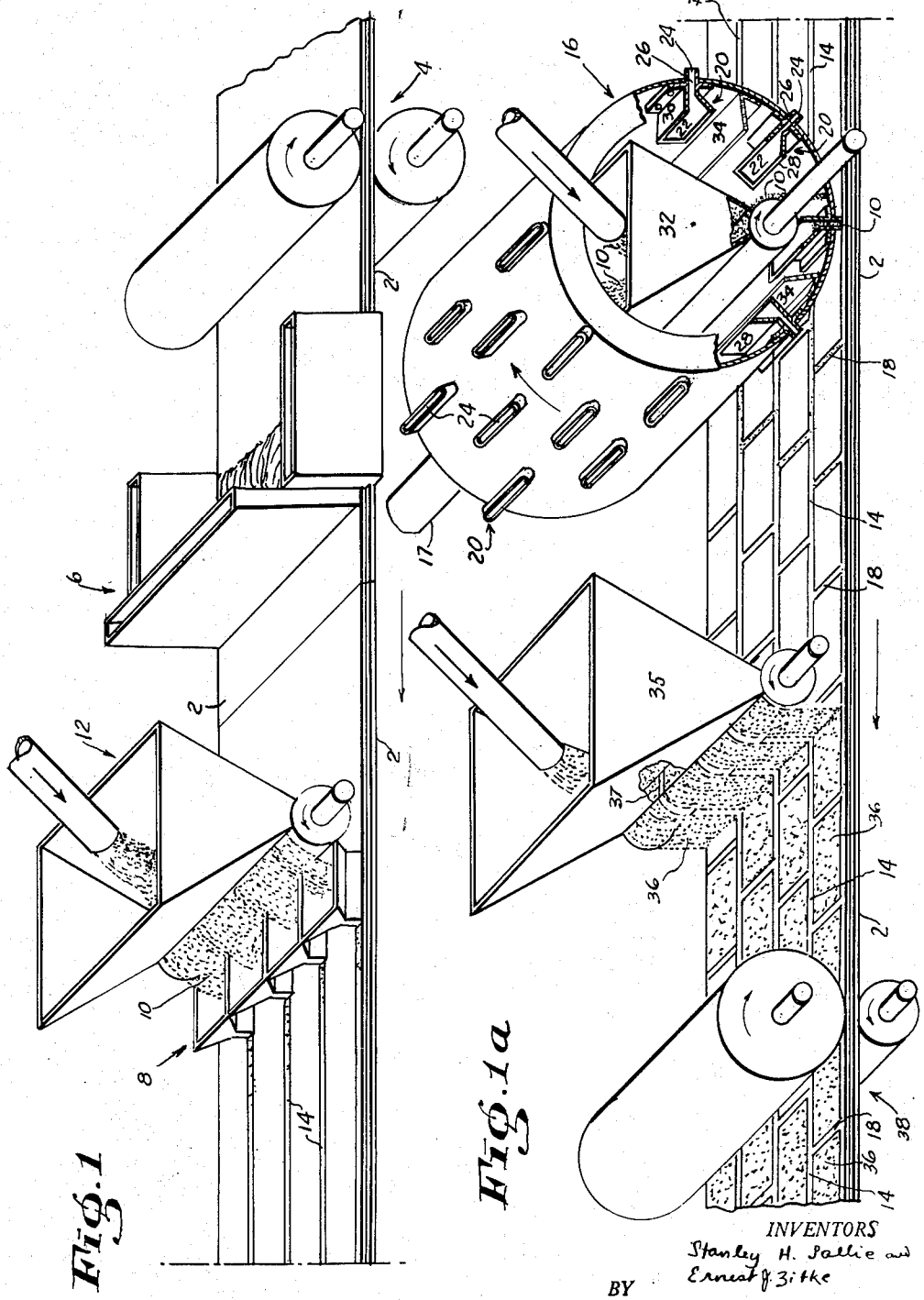
INVENTORS
Stanley H. Sallie and
Ernest J. Zitke
BY
William W. Rymer, Jr.
ATTORNEY

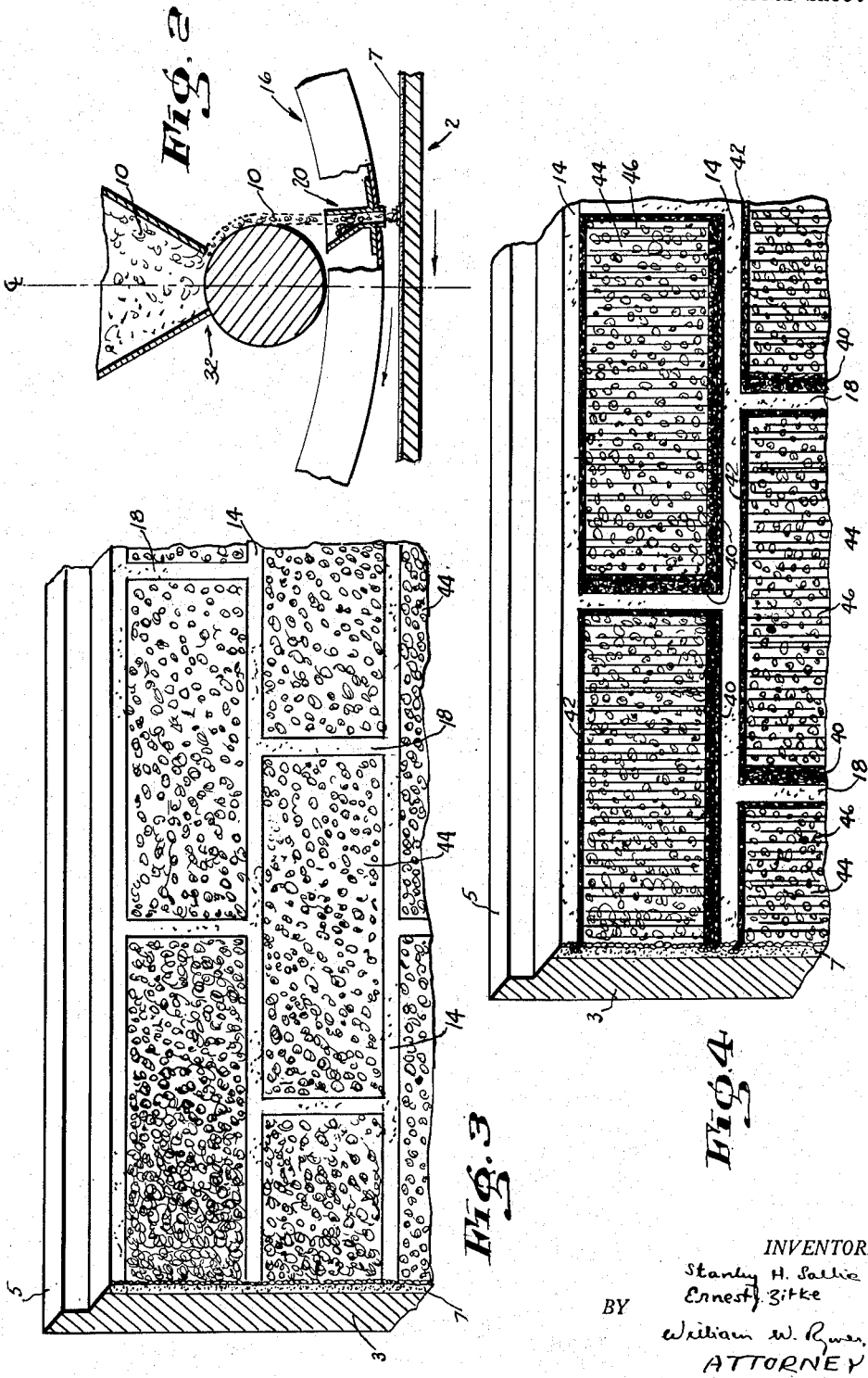

— # United States Patent Office

2,775,532
METHOD AND APPARATUS FOR MAKING PATTERNED SIDING

Stanley H. Sallie, Mansfield, and Ernest J. Zitke, Brockton, Mass., assignors to Bird & Son, Inc., East Walpole, Mass., a corporation Application September 24, 1952, Serial No. 311,224

10 Claims. (Cl. 117—25)

This invention relates to patterned siding surfaced with granules of different colors on different areas, and to a method and apparatus for manufacturing the same. More particularly, the invention concerns rigid panels of brick- and stone-masonry simulating siding in which mortar-simulating areas are coated with granules of one color, and brick- or stone-simulating areas are coated with granules of another color, and yet the panels are coated over their entire surface with only a single layer of adhesive and a single layer of granules. The invention also concerns a method and apparatus which makes possible the manufacture of such panels.

Heretofore it has been impossible in practice to manufacture rigid panels having brick or stone areas simulated by granules of one color and mortar areas simulated by granules of another color without at least coating the panel with two layers of granules over some areas.

In one method heretofore practiced, the asphalt coating first provided was first covered by a layer of the granules colored to simulate (for example) brick. After these were embedded, a hot embossing roll was applied, to expose the asphalt (and press below its surface the granules already embedded therein) in the areas ultimately to represent mortar lines. The panel was then covered with a layer of granules of mortar-simulating color, and passed again between embedding rolls. These granules adhered over the areas exposed by the hot embossing rolls, and so, except for the usual step of removing excess granules, the brick-simulating panel was completed. Panels produced by this method were made heavier and more expensive to manufacture by the extra layer of granules required over mortar simulating areas. But an even more serious disadvantage of these panels was that the quantity of asphalt exposed by the hot embossing roll was inadequate to satisfactorily bond the layer of granules thereafter embedded in it. On exposure to weathering, substantial amounts of these granules were lost, marring the appearance of the panels as well as decreasing their resistance to weather.

In a second method heretofore suggested, panels were first coated with asphalt and then covered with a layer of granules of the color chosen to simulate mortar lines, these granules then being embedded in the adhesive asphalt by passing the panel between rolls. The panel was then printed in the areas meant to simulate, for example, brick, with another coating of asphalt. A layer of granules of brick-simulating color was then spread over the panel, which was then again passed between embedding rolls; these granules adhered only over the areas printed with the second coating of asphalt, and so a brick-masonry simulating panel was produced. Panels prepared by this method had several disadvantages. First, the second layer of asphalt and the second layer of granules required over a large part of the panel area considerably increased materials costs per panel. Second, these second layers increased the weight of the panels, making them less easily handled. Third, the mortar-simulating areas were left in a lower plane than the brick-simulating areas, and this produced an appearance of horizontal bands running around structures covered with these panels, when seen from some angles.

It is an object of the present invention to provide rigid panels of siding in which granules of one color simulate brick or stone and granules of another color simulate mortar, and in which every part of the panels is covered by a single layer of asphalt or other adhesive and a single layer of granules.

It is a further object to provide panels of this character in which exposed mortar line simulating granules and exposed brick- or stone-simulating granules both lie in a common plane.

It is a further object of this invention to provide a method and apparatus which make possible the manufacture of such panels.

Heretofore it has been impossible to deposit granules on moving, rigid, adhesive-coated panels with sufficient precision to enable production of a brick- or stone-masonry simulating pattern by simply embedding deposited granules. It has been impossible to cover the discontinuous areas involved with sufficient accuracy and sharpness of definition. Such blurring and overlap have resulted at the edges of the areas (whether brick-, stone-, or mortar-simulating) sought to be defined by granule deposit alone, particularly the edges perpendicular to the direction of panel movement, that the production of a panel of realistic appearance has been out of the question.

We have discovered a method and apparatus by means of which granules may be deposited with sufficient accuracy and definition that, if desired, patterns in two or more different colors of granules can be produced with accuracy and precision by simply embedding deposited granules.

An important feature of our new method and apparatus is that granules deposited in patterns are, at the time they fall onto the moving panels, made to move in the same direction as the panels, and at substantially the same velocity. This feature is of great importance to the minimization of scattering and spraying, and the consequent production of sharply defined and accurately limited areas.

Another feature of our new method and apparatus is that it makes possible the deposit of granules to simulate vertical mortar lines in completed masonry patterns, on moving, rigid, adhesive-coated panels with sufficient precision and accuracy; despite the fact that these lines extend perpendicularly to the direction of panel movement and may be very narrow, of the order of a half inch, in the direction of panel movement.

Another feature of our new method and apparatus is that granules are deposited on panels of the character described from cups mounted in a rotating drum or equivalent structure. The drum, which is made to rotate with a peripheral velocity equal to the linear velocity of the panels moving beneath it, is of substantial diameter, such for example as to make its circumference twice the length of a panel. Mounting the cups through which granules are deposited in a drum of larger diameter lengthens the period, both before and after a particular cup is at the bottom of the rotating drum, during which granules may fall from it onto substantially the same area of the panel moving underneath, since it lessens the degree of curvature of the arc described by a discharging cup, i. e., the larger the diameter of the drum, the longer the period during which the orifice of a cup and the area of panel on which that cup should deposit granules are on substantially the same imaginary vertical lines.

Another feature of our new method and apparatus is that the exact quantity of granules desired to be deposited on each area of the panel is introduced into each cup shortly before it reaches the bottom of the rotating drum, and is fully discharged by each cup as it nears, reaches, and passes the bottom in its rotational cycle.

A further feature of our new method and apparatus is that granule recycling is minimized, with consequent lessening of granule pulverization and power requirements. We accomplish this by providing a mouth at the top of each cup substantially larger in area than the cup orifice. This not only permits use of a lower delivery rate of granules from the hopper, because of the concentrating or focusing effect of the cups; but also results in the useful application of a larger fraction of the granules that are in fact dropped, because the area over which granules are usefully caught is a greater fraction of the area over which they are dropped than would be the case except for the concentrating effect of the cups.

A further feature of our now method and apparatus is that the orifices in our granule delivery cups are of as narrow a width, in the direction of panel movement, as is consistent with free flow of granules. They may be less than ¼", in fact as narrow as ⅛", even though a mortar line area ½" in width is desired. Deposit over the wider width is the result of the slight scatter effect remaining, the slight deviation of the cup orifices from vertical alignment with the same areas of the panel as the discharging cups approach and move away from absolute bottom in their rotation, the tendency of the deposited pile of granules to broaden at its base in accordance with the granules' angle of repose, and the internal configuration of the cups.

A further feature of our new method and apparatus is that the orifices in the cups are preceded by a narrow neck of substantial length. This neck has the effect of damping the bouncing-around that occurs when granules fall into the cup from the hopper, and directs the granules in a substantially vertical stream onto the panels beneath.

These and other features and advantages of our invention will become apparent from the following description taken in the light of the accompanying drawings illustrating a preferred embodiment of the invention. In the drawings;

Figs. 1 and 1a are an isometric representation, partially diagrammatic, and partially in section, of our new apparatus and method, and of one form of our new panels produced thereby, Fig. 1a being a continuation of Fig. 1;

Fig. 2 is a view, partially in section, of portions of the rotating drum, the hopper mounted within it, and the panel passing beneath it, showing a cup which has been moved almost through the stream of granules falling from the hopper, and is just beginning to deposit granules onto the moving panel;

Fig. 3 is one form of a new panel in accordance with our invention; and

Fig. 4 is another form of a new panel in accordance with our invention.

Referring now to the drawings, there is shown in Figs. 1 and 1a rigid panels 2. The bases of the panels 2 may typically be of the usual rigid impregnated insulating or composition board 3, for example 43" long by 14" wide, with shiplap flanges 5 at the edges thereof so that said panels are adapted to be applied to a building wall in abutting coplanar relation.

The panels 2 are, as shown in Fig. 1, frictionally engaged between push rolls 4, which rotate at a rate suitable to move the panels 2 forward at the desired speed. After passing through the push rolls 4, the panels 2 are supported in a horizontal plane by suitable means not shown; as, by a series of angle irons, parallel and extending in the direction of panel movement, each of said angle irons having one of its legs perpendicular to and in contact with the moving panels 2. The panels 2 then pass through the coating box 6, which coats said panels with a suitable thickness of asphalt 7, in the usual manner. The panels 2 then pass beneath the distributing hopper 8, which directs granules 10, falling at a suitable rate from the spill hopper 12, so that parallel lines 14 of granules are deposited on the adhesive-coated panels 2. These lines simulate horizontal mortar lines in the completed panels, and the granules 10 are of a color suitable for simulation of mortar.

As shown in Fig. 1a, the panels 2 then pass beneath our new rotating drum 16, which in the embodiment shown functions to deposit on the adhesive-coated panels 2 granules 10 in short discontinuous lines 18, to simulate vertical mortar lines. The drum 16 is of substantial diameter. For example, its circumference may suitably be equal to twice the length of a typical 43" panel. (The circumference of the drum obviously need not necessarily be an even multiple of the length of a panel, however. Also, if somewhat less accuracy of deposit is needed, the drum circumference may be less than in the embodiment described.)

The drum 16 has mounted therein by any suitable means a multiplicity of cups 20, said cups being disposed over the width and periphery of said drum in the same pattern in which vertical mortarlines are to be disposed over the length and width of said panels. That is, the peripheral distance between said cups is the same as the linear distance desired between vertical mortarlines along the length of said panels; and the distance relationships between said cups across the width of said drum are the same as those desired between said vertical mortar lines across the width of said panels. The drum 16 is rotated, clockwise as viewed in the drawing, at a peripheral speed equal to the linear velocity with which the panels 2 pass beneath it; so that granules 10 discharged from a cup 20 as said cup reaches the bottom of the rotating drum 16 have a velocity in the same direction, and of the same magnitude, as the velocity of the panels 2. (When we refer herein to drum peripheral speed, we mean actually the peripheral speed of the imaginary cylindrical surface determined by and passing through the centerlines of all the orifices 24. It is obvious that it is this peripheral speed that must be equal to the linear speed of the panels 2 in order to deposit granules having that same speed.)

The cups 20 are provided with mouths 22 substantially larger in area than the orifices 24 through which granules are discharged. In the embodiment shown the long dimension of the cup is the same at mouth 22 and orifice 24, and the increased mouth area is achieved by making the mouth substantially wider than the orifice. The mouth 22 might however desirably be made larger in both dimensions than the orifice 24. The orifices 24 are, in our preferred embodiment, just wide enough to permit free flow of granules therethrough, say ⅛" where granules of a usual character are being deposited. Each of said orifices is preceded by a narrow neck 26 of substantial length, say ⅜" when granules of the character typically used in siding manufacture are to be deposited. The width of the neck 26 may suitably be the same as that of an orifice 24.

Each cup 20 may suitably be constructed, as shown in Fig. 1a, with its leading wall 28 bent forward at an angle from the top of the neck 26, and with its rear wall 30 in a single plane. However, this configuration is not critical, and the wider mouth might be achieved by flaring the rear wall, as well as (or even instead of) the leading wall, away from the neck.

Granules 10 are delivered in a continuous stream to the inside of the drum 16 by the spill hopper 32, which is mounted independently of the drum 16, and functions in the usual manner. The stream of granules 10 falling from the spill hopper impinges on the drum 16 along an area thereof that has not quite reached the bottom in its rotating cycle.

Granules that fall into the drum 16 but outside the cups 20 are returned to the spill hopper 32 by baffles 34 which extend across the width of the drum 16 between rows of cups 20. The baffles 34 are attached to the drum 16 by welding or any suitable means. These baffles carry granules along with the rotating drum and as each baffle nears the top of its cycle the granules carried before it fall off into the spill hopper 32.

In operation, granules 10 fall from the spill hopper 32 into the cups 20, each cup passing beneath the falling stream just before reaching the bottom in its rotating cycle. Each cup is of course nearer the bottom in its rotation before any granules 10 fall through onto the panels 2, because of the time required for granules to drop through the cup.

The granules, which are bouncing around in a random manner after falling into the cup, are all given a substantially vertical direction of fall by the narrow necks 26 leading to the orifices 24 which are of sufficient length to adequately perform this function.

The quantity of granules deposited on each simulated vertical mortar-line 18 is the amount of granules collected by a cup as it passes beneath the falling stream, and is a function of rate of granule flow (from the spill hopper 32), drum 16 rotational rate, and cup mouth 22 area. Because of our provision for cup mouths 22 of area greater than cup orifices 24, we achieve a concentrating effect that enables deposit of the desired quantity of granules while using much lower granule flow rates. This has the advantage of reducing the quantity of granules that must be carried by the baffles back to the spill hopper and recirculated, and so reduces pulverization and power requirements.

Although some granules fall from each cup before it reaches the bottom in its cycle, and some may continue to fall slightly after it passes the bottom in its cycle, this does not have the effect of unduly widening the simulated vertical mortar lines 18. The peripheral speed of the drum 16 and each cup 20, and so of the falling granules 10, are identical in quantity, and, at tangency (cut at absolute bottom), in direction. Consequently, over the short arc of relatively large diameter during which each cup discharges, its orifice 24 remains directly above substantially the same area of a panel 2.

However, vertical mortar lines 18 wider than the orifices 24 are produced, as we have indicated. This is due in part to the slight deviation of orifices from vertical alignment with the same area of panel during the period of discharge, in part to the scatter effect due to impact of the granules on the panel, and in part to the tendency of the piles of granules deposited to widen at their base as the quantity of granule deposited increases, in accordance with their angle of repose.

After the lines 18 simulating vertical mortar joints are deposited, the panels 2 are passed beneath the spill hopper 35, and granules 36 of a color to simulate brick are deposited thereon. These granules may be deposited evenly over the entire surface of the panel 2, or rigid fingers 37 may be introduced across the outlet of the spill hopper 35 so as to minimize deposit on areas already coated with simulated horizontal mortar joint lines 14. Instead of the rigid fingers 37, a rotating cage-like structure might be used, and deposit on areas previously covered with both simulated horizontal mortar joint lines 14 and vertical mortar joint lines 18 minimized. Such a cage would have bars in such a pattern that, when the cage-like structure was geared to rotate in synchronization with the drum 16, bars would pass under the spill hopper 35 just as corresponding lines 14 and 18 on a panel 2 moved thereunder, said bars being always above said lines 14 and 18 and substantially preventing the deposit of granules from spill hopper 35 thereonto.

In some cases, particularly where it is desired to cover different areas with respectively more than two different colors of granule, it may be desirable to use a plurality of rotating drums similar in general construction to drum 16, though said drums may be of different diameter and may contain cups somewhat different in character, having orifice shapes somewhat different in character. A different color and pattern of granule may for example be deposited by each drum. These additional drums would be placed intermediate of drum 16 and spill hopper 35. If the plurality of drums collectively deposit granules over the entire surface of the panel, or the entire area thereof desired to be covered, the spill hopper 35 can be eliminated.

The panel 2 is then passed between the press rolls 38, to embed the granules 10 and 36 in the asphalt. Any granules 36 deposited over the granules 10 are withdrawn, along with all other excess granules, by subjecting the top surface of the panel 2 to a vacuum, in any suitable manner. The granules remaining may then be more securely embedded by passing the panels 2 through further press rolls, not shown.

The push rolls 4, the press rolls 38, and the drum 16 may be rotated as indicated by any suitable means, not shown, and may suitably all be driven ultimately by a single electric motor. The push rolls 4 may desirably be connected therewith through a variable pulley, so as to facilitate some adjustment of R. P. M. The shaft 17 of the drum 16 may desirably be connected with said motor through differential gears and a speed changer, so as to facilitate accurate adjustments of its R. P. M.

In this manner, one form of our new rigid panel (Fig. 3), which for the first time provides a panel with sharply defined and accurately positioned patterns in contrasting granule colors, in which panel there is but a single layer of granules and a single layer of adhesive over the entire area thereof, is produced. In this embodiment all of the granules are in the same plane.

Our preferred form of our new panel is shown, however, in Fig. 4. In this form we expose the asphalt at areas 40 and 42 along the interfaces between the mortar-simulating areas 14 and 18 and the brick-simulating areas 44, by means of hot embossing rolls, in the usual manner. This has the effect not only of further sharpening these interfaces between brick- and mortar-simulating areas, but also of providing shadow lines, to add to the realistic appearance of the panels as applied. In Fig. 4 we have shown the lines 40 as wider than the lines 42, but if desired all lines at interfaces between mortar and brick may be of the same width. In our preferred form we also emboss the brick areas along lines 46, in order to simulate wire-cut brick; this feature may be quite suitably omitted if desired, however. The granules in lines 46 may be submerged in the asphalt, but preferably are not completely submerged. Although in this form the granules submerged in asphalt in areas 40 and 42, as well as the granules in the embossed areas 46, are not in the same plane as the other granules remaining exposed, the panel retains the distinctive features of the invention. I. e., no area of the panel contains more nor less than a single layer of asphalt and a single layer of granules. Also, substantially all granules left exposed, of both colors, are in the same plane.

In another embodiment of our new panel, we may emboss the brick-simulating areas, without completely submerging any of the granules thereon, to provide a non-planar surface, undulating throughout said areas. Here again no area of the panel contains more nor less than a single layer of asphalt and a single layer of granules.

It will be apparent that other embodiments of our new product, process, and apparatus, within the spirit and scope of the appended claims will occur to those skilled in the art. For example, our new process and apparatus may be used to deposit granules over areas of greater size, such as brick- or stone-simulating areas, by providing series of the narrow orifices in parallel relation and sufficiently close together so that the spreading effect already referred to (⅛" orifice produced ½" mortar-simulating line, above) serves to fuse together the deposits from separate areas and form a continuous area of larger size. Such series of parallel orifices may be included in cups of modified design but including essentially the features of the cups in the embodiment described, the cups being mounted in a rotating drum of the character described.

Similarly, lines at an angle to the direction of panel movement, though not perpendicular thereto, may be deposited on a moving panel with accuracy and precision, all in accordance with our new invention.

It will be apparent thus that our new method and apparatus will function to produce our new panel patterned not only in a simulation of brick- or stone-masonry, but in a simulation of shingles or of any other desired pattern, all with accuracy and precision.

We claim:

1. A method of depositing granules on a moving adhesive-coated panel in spaced patterns with accuracy and sharpness of definition, which includes the steps of moving the adhesive-coated panel in a substantially horizontal direction, moving the granules above the panel at a velocity having a horizontal component substantially equal to the velocity of said panel and in the same direction as the movement of the panel and dropping the granules onto the coated panel to cover spaced areas and thereby forming the patterns.

2. The method of claim 1 in which during said moving said granules are concentrated by passing them through a passage of diminishing area.

3. The method of claim 1 in which during said moving said granules are given a substantially uniform direction of flow free from scattering by passing said granules through a narrow passage of substantial length.

4. The method of claim 1 in which during said moving said granules are formed into a stream having, in the direction of panel movement, the least width consistent with free flow thereof through an orifice.

5. Apparatus for depositing granules on a moving adhesive-coated panel in patterns with accuracy and precision comprising a drum mounted for rotation above said panel, a multiplicity of cups mounted around the periphery of said drum to form openings therein, said cups each including an open mouth directed inwardly of said periphery, an orifice directed outwardly of said periphery, and a passage joining said mouth and said orifice, said passage being adapted for retention of said granules long enough so that said granules are given the direction and velocity of movement of said cups, a hopper mounted within but independently of said drum for discharge of said granules thereinto and means for returning to said hopper granules falling therefrom and not received in said cups.

6. The apparatus of claim 5 in which each said mouth has an area substantially greater than each said orifice, whereby the quantity of granules falling outside the cups and therefore granule flow rate and recycling is minimized.

7. The apparatus of claim 6 in which said orifice has a width, in the direction in which said drum is adapted to be rotated, just sufficient to permit free flow of granules therethrough.

8. The apparatus of claim 6 in which said orifice has a width, in the direction in which said drum is adapted to be rotated, less than one quarter inch.

9. The apparatus of claim 6 in which each said cup is provided, adjacent its said orifice, with a narrow neck of substantial length extending radially of said drum, whereby a substantially uniform direction of flow is imparted to said granules, and scattering is minimized.

10. Apparatus for depositing granules on a moving adhesive-coated panel in patterns with accuracy and precision comprising a drum mounted for rotation above said panel, a multiplicity of cups mounted around the periphery of said drum, said cups each including an open mouth directed inwardly of said periphery, an orifice directed outwardly of said periphery, and a passage joining said mouth and said orifice, each said orifice having a width in the direction in which said drum is adapted to be rotated just sufficient to permit free flow of granules therethrough and having adjacent thereto in the respective said cup a neck of the same width and substantial length, and each said mouth having a width and area substantially greater than each said orifice, a hopper mounted within but independently of said drum for continuously discharging granules at a constant rate thereinto and directed at an area thereof just preceding absolute bottom thereof, and means for returning to said hopper granules falling therefrom and not received in said cups.

References Cited in the file of this patent
UNITED STATES PATENTS

| | | |
|---|---|---|
| 1,394,149 | Cumfer et al. | Oct. 18, 1929 |
| 1,448,203 | Cumfer et al. | Mar. 13, 1923 |
| 1,484,760 | Cumfer | Feb. 26, 1924 |
| 1,916,095 | Cumfer | Jan. 27, 1933 |
| 2,221,475 | Goldschmidt | Nov. 12, 1940 |
| 2,270,808 | Kaye | Jan. 20, 1942 |
| 2,559,543 | Muench | July 3, 1951 |